United States Patent
O'Connell

(10) Patent No.: US 6,660,429 B2
(45) Date of Patent: Dec. 9, 2003

(54) BATTERY LEADS FOR USE IN A MULTI-LAYER CELL AND METHOD OF FORMING THE SAME

(75) Inventor: Ronald V. O'Connell, Harpersfield, OH (US)

(73) Assignee: NGK Spark Plug Co., Ltd. (JP)

( * ) Notice: Subject to any disclaimer, the term of this patent is extended or adjusted under 35 U.S.C. 154(b) by 64 days.

(21) Appl. No.: 10/051,789

(22) Filed: Jan. 17, 2002

(65) Prior Publication Data

US 2003/0134195 A1 Jul. 17, 2003

(51) Int. Cl.[7] ............................................... H01M 2/08
(52) U.S. Cl. ............................ 429/184; 429/233; 29/2
(58) Field of Search ..................... 429/184, 233; 29/2

(56) References Cited

U.S. PATENT DOCUMENTS

| 6,403,262 | B1 | * | 6/2002 | Xing et al. ............ 429/231.95 |
| 2003/0054241 | A1 | * | 3/2003 | Yamashita et al. .......... 429/181 |

FOREIGN PATENT DOCUMENTS

| JP | 2001-222982 | * | 8/2001 | ............ H01M/2/02 |
| JP | 2001-243939 | * | 9/2001 | ............ H01M/2/30 |
| JP | 2002-246269 | * | 8/2002 | ............ H01G/9/16 |
| JP | 2002-279967 | * | 9/2002 | ............ H01M/2/30 |

* cited by examiner

Primary Examiner—Carol Chaney
Assistant Examiner—Dah-Wei D. Yuan
(74) Attorney, Agent, or Firm—Mark Kusner; Michael A. Jaffe

(57) ABSTRACT

A method of forming battery leads, comprising the steps of: forming a plurality of aligned, spaced-apart elongated openings in a rectangular, metallic sheet, the metallic sheet having side edges and a width between the side edges equal to a desired length of a battery lead, the openings extending between the side edges and being aligned in a row that extends parallel to the side edges; treating areas of the surfaces of the metallic sheet between the openings to enhance the adhesive properties thereof; applying a strip of an adhesive/sealant material to each side of the metallic strip over the area and the slots; and cutting a battery lead from the metallic sheet by cutting the metallic sheet widthwise through each opening from one side edge to the other side edge.

7 Claims, 5 Drawing Sheets

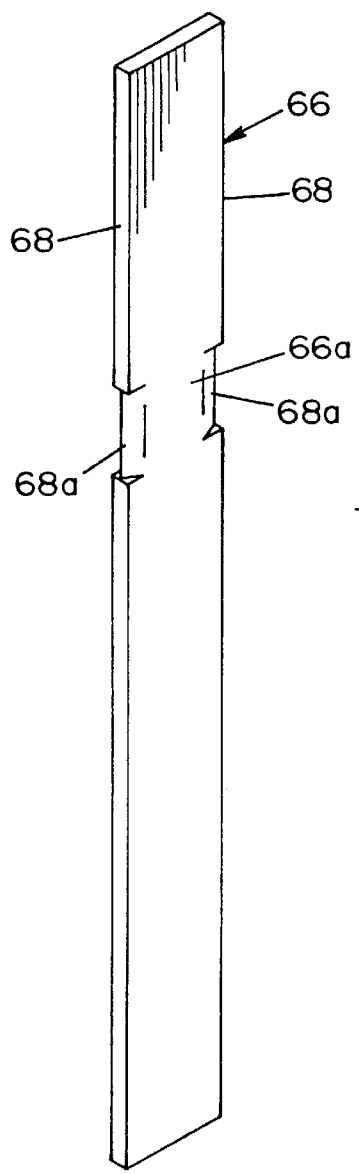
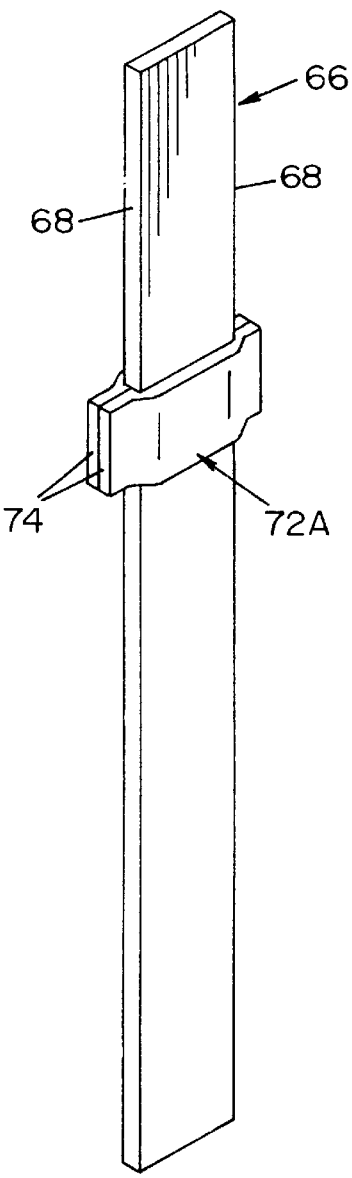
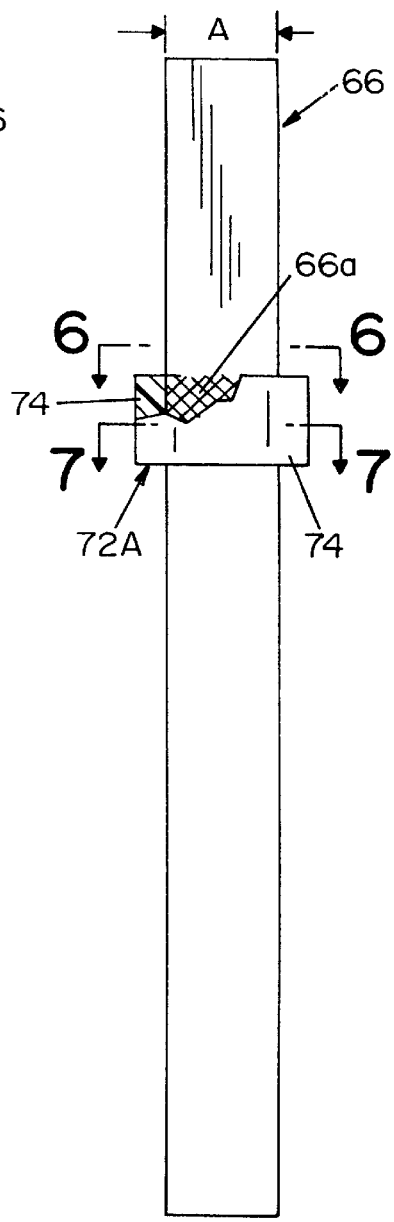
FIG. 3    FIG. 4    FIG. 5
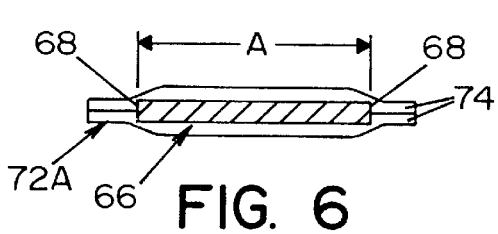
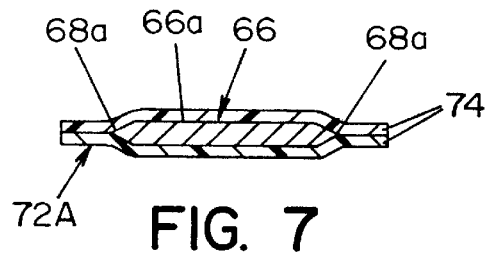
FIG. 6    FIG. 7

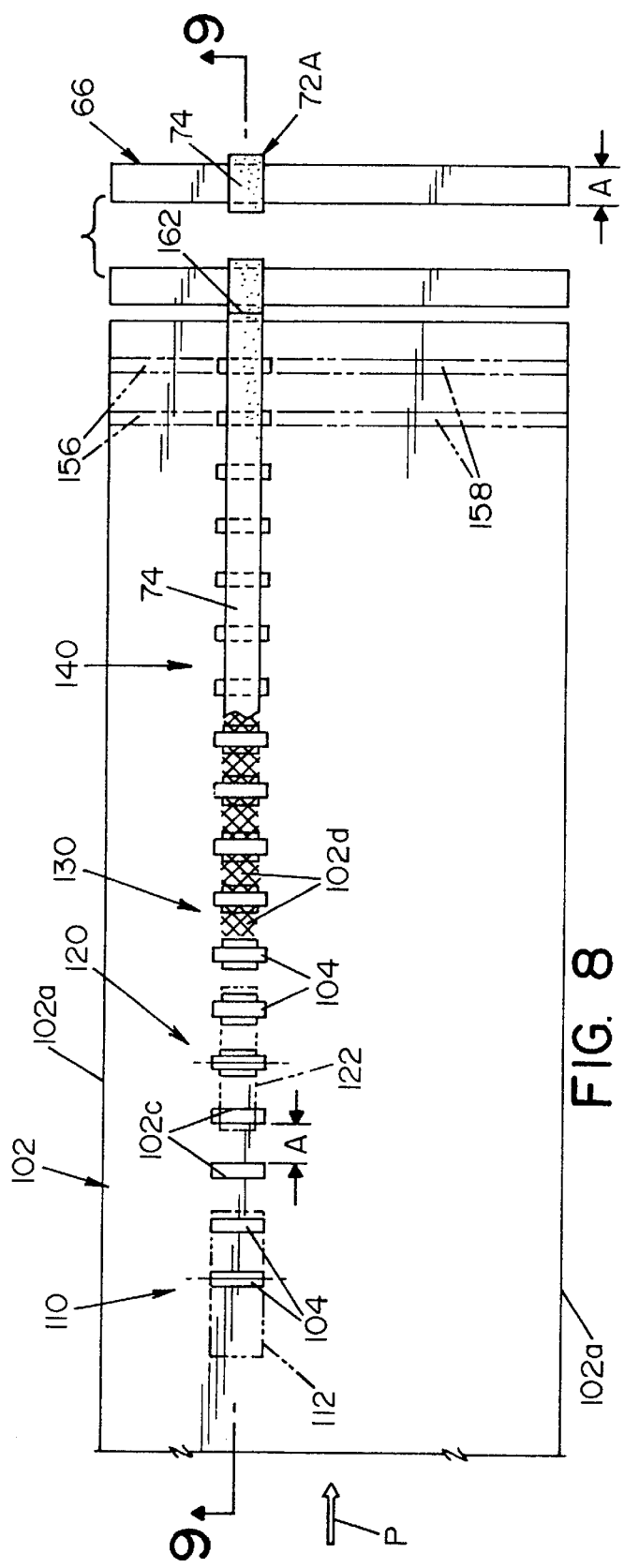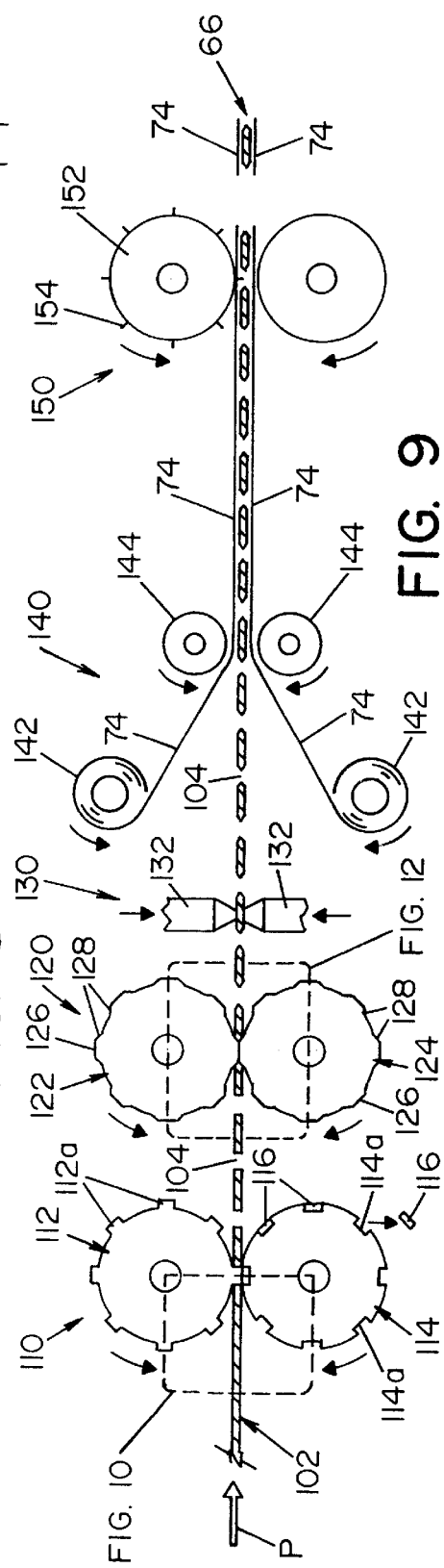

BATTERY LEADS FOR USE IN A MULTI-LAYER CELL AND METHOD OF FORMING THE SAME

FIELD OF THE INVENTION

The present invention relates generally to Li-ion and/or Li-ion polymer batteries, and more particularly, to battery leads for use in a multi-layer cell, and a method of forming the same.

BACKGROUND OF THE INVENTION

A Li-ion and/or Li-ion polymer battery is generally comprised of a plurality of layered sections, namely, an anode section, a cathode section and a separator layer that is disposed between the anode section and cathode section. Multi-layered battery cells are comprised of a plurality of anode sections and cathode sections.

Each anode section and each cathode section includes a layer of a conductive material that is disposed within or in contact with such section. This layer forms what is conventionally referred to as a "current collector." It is conventionally known to use metal screens or meshes or foils to form the aforementioned current collectors. Typically, copper mesh is used to form an anode current collector, and an aluminum metal mesh is used to form a cathode current collector. Multi-layer battery cells typically include a plurality of anode current collectors and a plurality of cathode current collectors. Each current collector generally includes an outwardly extending, short tab that is ultimately to be connected to a battery lead. It is, therefore, necessary to join all anode current collectors together and attach them to a single anode battery lead, and to join all cathode current collector tabs together and attach them to a cathode battery lead.

The anode and cathode battery leads are typically comprised of a flat, metallic strip, formed of copper, aluminum or nickel. The battery leads are typically formed from a generally continuous metallic strip having a width equal to the desired width of the battery lead. A length of the metallic strip, equal to the desired length of the battery lead, is then cut from a metallic strip. Typically, a portion of the battery lead undergoes a surface treatment, such as a cleaning and/or a roughening treatment in the area where the lead will extend through a battery package. This treated area increases adhesion and helps to form a seal around the battery lead where it extends through a battery package.

Sealing around a conventional battery lead is problematic because the battery lead is generally rectangular in cross-section. When pressed between two sheets of a packaging laminate, gaps or openings may be formed along the lateral edges of the lead preventing complete sealing of the battery assembly within the packaging.

It is known to wrap each battery lead with an adhesive/sealant material that more easily conforms around the lead when heated and pressed between a packaging laminate. Even with the addition of an adhesive/sealant band, the surfaces of the battery lead undergo treatment to promote adhesion to an adjacent surrounding material. In this respect, each battery lead typically undergoes one or more surface treatments along a portion thereof to enhance adhesion between the battery lead and a surrounding material that forms a seal around the battery lead where the battery lead projects through a packaging laminate. Performing these treatment processes on each individual lead is time-consuming and costly.

The present invention overcomes these and other problems and provides a method of forming battery leads from metallic sheet, wherein surface treatments on the battery lead are performed prior to severing a battery lead from the metallic sheet.

SUMMARY OF THE INVENTION

In accordance with a preferred embodiment of the present invention, there is provided a method of forming battery leads, comprising the steps of:

forming a plurality of aligned, spaced-apart elongated openings in a rectangular, metallic sheet, the metallic sheet having side edges and a width between the side edges equal to a desired length of a battery lead, the openings extending between the side edges and being aligned in a row that extends parallel to the side edges;

treating areas of the surfaces of the metallic sheet between the openings to enhance the adhesive properties thereof;

applying a strip of an adhesive/sealant material to each side of the metallic strip over the surfaces and the slots; and cutting a battery lead from the metallic sheet by cutting the metallic sheet widthwise through each opening from one side edge to the other side edge.

In accordance with another aspect of the present invention, there is provided a battery lead, comprised of a thin, elongated, rectangular strip of a metal selected from the group consisting of copper, aluminum and nickel. A band of an adhesive/sealant material surrounds a portion of the strip. The strip has knife-like edges where the adhesive/sealant material surrounds the strip.

It is another object of the present invention to provide a battery lead for Li-ion and/or Li-ion polymer batteries.

It is another object of the present invention to provide a method of forming a battery lead for Li-ion and/or Li-ion polymer batteries.

It is another object of the present invention to provide a method of forming a battery lead as described, wherein the battery lead is generally a flat, rectangular strip that is cut widthwise from a metallic sheet.

A still further object of the present invention is to provide a method of forming a battery lead as described above that includes a process for shaping the edges of the battery lead to facilitate better sealing with a battery package.

These and other objects will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 3 is a perspective view of a battery lead illustrating a preferred embodiment of the present invention;

FIG. 4 is a perspective view of the battery lead shown in FIG. 3 showing a protective band thereon;

FIG. 5 is a partially sectioned, top plan view of the battery lead shown in FIG. 4;

FIG. 6 is a sectional view taken along lines 6—6 of FIG. 5;

FIG. 7 is a sectional view taken along lines 7—7 of FIG. 5;

FIG. 8 is a top plan view of a generally continuous metallic sheet schematically illustrating a process for forming battery leads therefrom;

FIG. 9 is a side sectional view taken along lines 9—9 of FIG. 8 of the metallic sheet, schematically illustrating the different steps for forming a battery lead;

DETAILED DESCRIPTION OF PREFERRED EMBODIMENTS

Figure 1:
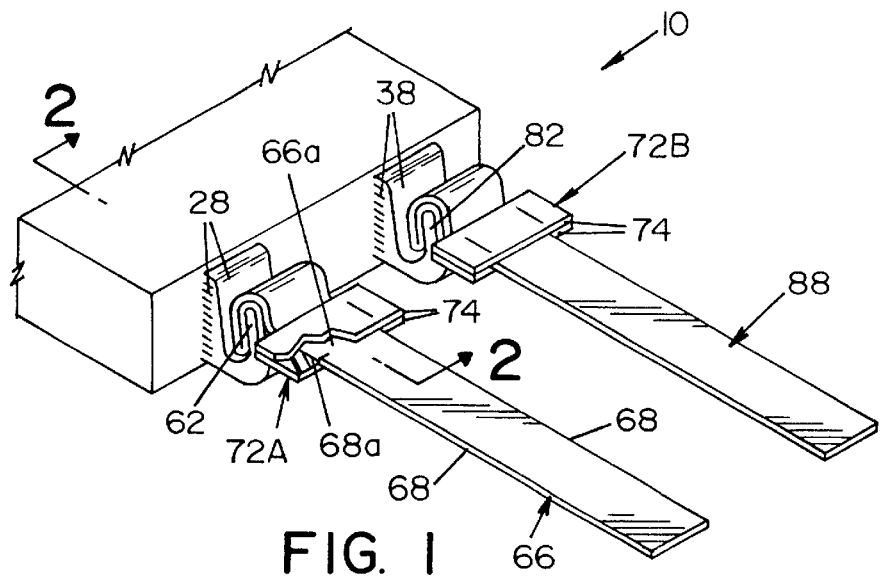
FIG. 1 is a perspective view of a portion of a multi-layer battery cell showing a plurality of anode current collector tabs and a plurality of cathode current collector tabs, attached respectively to an anode battery lead and a cathode battery lead.

Referring now to the drawings wherein the showings are for the purpose of illustrating the preferred embodiment of the invention only, and not for the purpose of limiting same, FIG. 1 shows one end of a battery assembly 10. Battery assembly 10 is preferably a polymer, electrolytic battery that may be a primary (non-rechargeable) battery or a secondary (rechargeable) battery. In the embodiment shown, battery assembly 10 is comprised of a plurality of battery bi-cells 12 (best illustrated in FIG. 2).

Each bi-cell 12 is comprised of two cathode sections 22 and an anode section 32 disposed therebetween. A separator layer 42 is disposed between anode section 32 and each cathode section 22. Each cathode section 22 is comprised of two layers 24 of a cathode film. Cathode film layer 24 is preferably comprised of a lithiated metal oxide active material, an electrically conductive material and a binder material. A current collector 26 formed of a metal screen, metal mesh or a sheet of perforated metal is provided between cathode layers 24. Current collector 26 is preferably formed of an aluminum mesh. Current collector 26 preferably has a thickness of about 25 $\mu$m to about 50 $\mu$m. Current collector 26 includes an outwardly extending tab or strip 28. Each cathode layer 24 preferably has a thickness of about 50 $\mu$m to about 200 $\mu$m, and more preferably about 80 $\mu$m to about 150 $\mu$m.

Anode section 32 is comprised of two layers 34 of an anode film having a current collector 36 disposed therebetween. Current collector 36 is preferably formed of a metal mesh, metal screen or a sheet of perforated metal having a thickness of about 25 $\mu$m to about 50 $\mu$m. Current collector 36 is preferably formed of a copper mesh. The film-forming anode layers 34 are preferably comprised of a carbon active material, an electrically conductive material and a binder material. Current collector 36 includes an outwardly extending tab or strip 38. Each anode layer 34 preferably has a thickness of about 50 $\mu$m to about 200 $\mu$m, and more preferably about 80 $\mu$m to about 150 $\mu$m.

Figure 2:
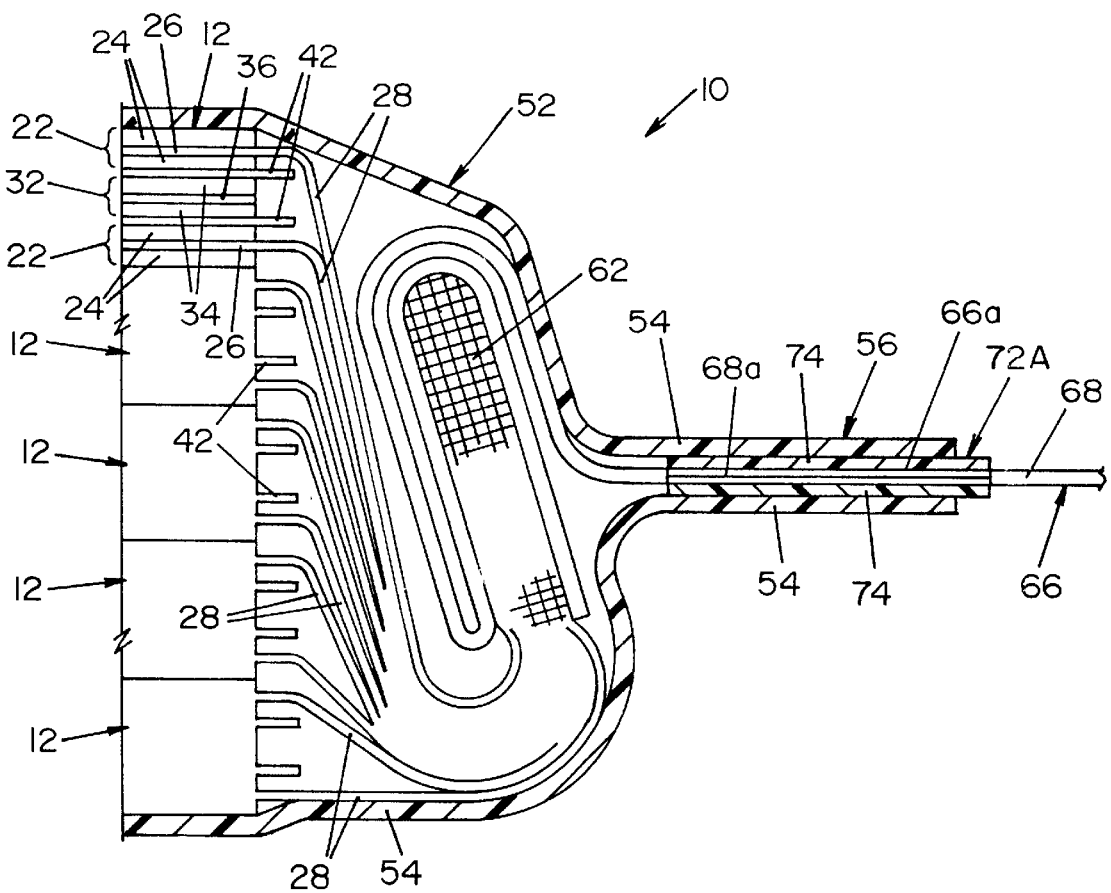
FIG. 2 is an enlarged, sectional view taken along lines 2—2 of FIG. 1, showing a cathode battery lead attached to a cathode tab weldment and extending through a battery package.

FIG. 2 is a side, elevational view of battery assembly 10 showing a plurality of current collector tabs extending therefrom. In the embodiment shown in FIG. 2, battery assembly 10 is comprised of five (5) bi-cells 12, i.e., ten (10) cathode sections 22 and five (5) anode sections 32, stacked one on top of another such that cathode current collector tabs 28 and anode current collector tabs 38 are justified and aligned.

Battery 10 is contained within a flexible package 52 formed of a laminate 54. Package 52 is partially shown in FIG. 2. Package 52 may be comprised of a flexible laminate 54 of the type disclosed in U.S. Pat. No. 6,207,271 B1 and U.S. Pat. No. 6,145,280, both to Daroux et al. The disclosures of U.S. Pat. Nos. 6,207,271 B1 and 6,145,280 are both expressly incorporated herein by reference.

The free ends of cathode current collector tabs 28 are joined together into a generally solid cathode tab weldment 62, best seen in FIG. 2. A metal, cathode battery lead 66 is attached to cathode tab weldment 62. Cathode battery lead 66 and anode battery lead 88 are typically formed of a thin, metallic strip, having a width approximately equal to the width of cathode current collector tabs 28 and anode current collector tabs 38.

Cathode battery lead 66 is adapted to extend through a sealed seam 56 formed by layers of laminate 54, as illustrated in FIG. 2. Package laminate 54 is sealed around cathode battery lead 66. An adhesive/sealing band 72A may be formed around cathode battery lead 66 to facilitate sealing and bonding of packaging laminate 54 to cathode battery lead 66. The composition of sealing band 72A, and a method of sealing packaging laminate 54 around cathode battery lead 66 is taught in U.S. patent application Ser. No. 09/271,954 to Daroux et al., the disclosure of which is expressly incorporated herein by reference.

In a similar fashion, anode current collector tabs 38 are joined together into a generally solid anode tab weldment 82, best seen in FIG. 1, and a metal, anode battery lead 88 is attached to anode tab weldment 82. Like cathode battery lead 66, anode battery lead 88 extends through seam 56 in package 52. An adhesive/sealing band 72B may be formed around anode battery lead 88 to facilitate sealing and bonding of packaging laminate 54 to anode battery lead portion 88. The anode tab assembly is offset from the cathode tab assembly to prevent contact therebetween.

In the embodiment shown, cathode battery lead 66 and anode battery lead 88 are essentially structurally the same in size and shape. Accordingly, only one cathode battery lead 66 shall be described in detail, it being understood that such description applies equally to the other.

As will be appreciated by those skilled in the art, the composition of cathode battery lead 66 may be different from anode battery lead 88. In this respect, cathode battery lead 66 and anode battery lead 88 may be formed of any conductive metal or alloy, but in preferred embodiments, cathode battery lead 66 is preferably formed of aluminum, and anode battery lead 88 is preferably formed of copper or nickel.

Referring now to FIGS. 3–7, cathode battery lead 66 is shown. Cathode battery lead 66 is basically an elongated, rectangular strip of metal. Lead 66 has generally flat, planar side edges 68 that extend over major portions of cathode battery leads 66. A portion, designated 66a in the drawings, of cathode battery lead 66 is formed to have sharp, i.e., "knife-like" edges 68a. In the embodiment shown, cathode battery lead edges 68 of cathode battery lead 66 are swaged or tapered to a point (knife-edge), as best seen in FIG. 7. Portion 66a of lead 66 is preferably surface treated, as illustrated in FIG. 5 by the area of cross-hatching. Portion 66a of cathode battery lead 66 is adapted to be disposed within seam 56, and to be the area of cathode battery lead 66 around which laminate 54 is sealed.

A band 72A of an adhesive/sealant material is formed about cathode lead portion 66a. In the embodiment shown, band 72A is formed of two separate strips 74 of an adhesive/sealant material. Strips 74 preferably extend beyond the lateral edges of cathode lead 66 such that the distal ends of each strip 74 engage the ends of the other strip 74. Strips 74 may be formed of a number of different types of adhesive/sealant material. In a preferred embodiment of the present invention, band 72A, i.e., strips 74, are formed of Surlyn®. Surlyn® is a registered trademark of the Dupont Company.

As best illustrated in FIG. 7, the tapered, knife-like edges 68a of cathode battery lead 66a facilitate good, matting coverage of strips 74 along the treated surfaces of cathode battery lead 66a.

Figure 10:
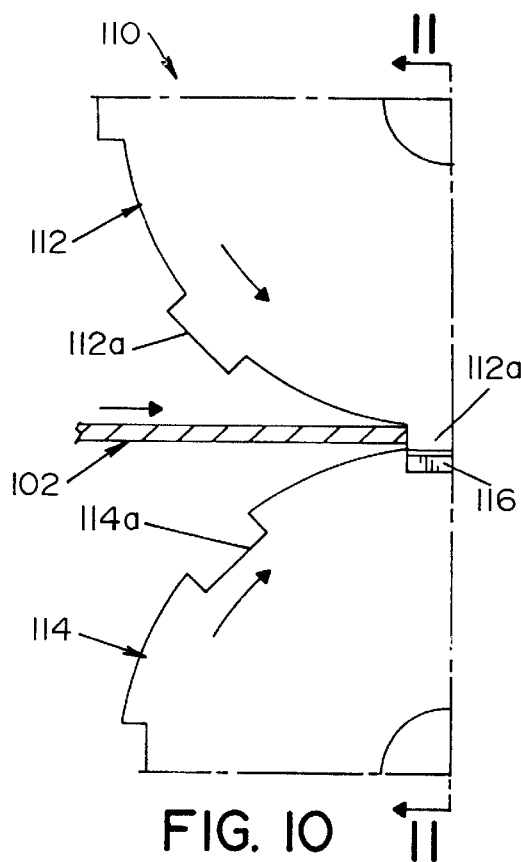
FIG. 10 is an enlarged, sectional view of the area designated in FIG. 9 showing a process for forming slots in the metallic sheet.

Referring now to FIGS. 8–12, cathode lead 66 shall now be described with respect to a preferred method of forming the same. FIGS. 9 and 10 illustrate a process for forming cathode battery lead 66. As will be appreciated from a further reading of the specification, the same process can also be used for anode battery lead 88. FIG. 8 is a top plan view of a metallic sheet 102. Metallic sheet 102 may be formed of aluminum or any other metal or metal alloy suitable for forming battery leads 66. Metallic sheet 102 is moved along a predetermined path indicated by arrow P. Metallic sheet 102 has a width equal to the desired length of cathode battery lead 66.

At a first location 110 (see FIG. 9), spaced-apart slots 104 are punched, cut or otherwise formed in metallic sheet 102 as it moves along path P. In the embodiment shown, slots 104 are rectangular in shape, and extend parallel to each other. Slots 104 are generally perpendicular to edges 102a of metallic sheet 102 and are aligned in a row that extends parallel to said side edges. The space "A" (best seen in FIG. 8) between the edges of adjacent slots 104 is preferably equal to the desired width of battery lead 66.

Figure 11:
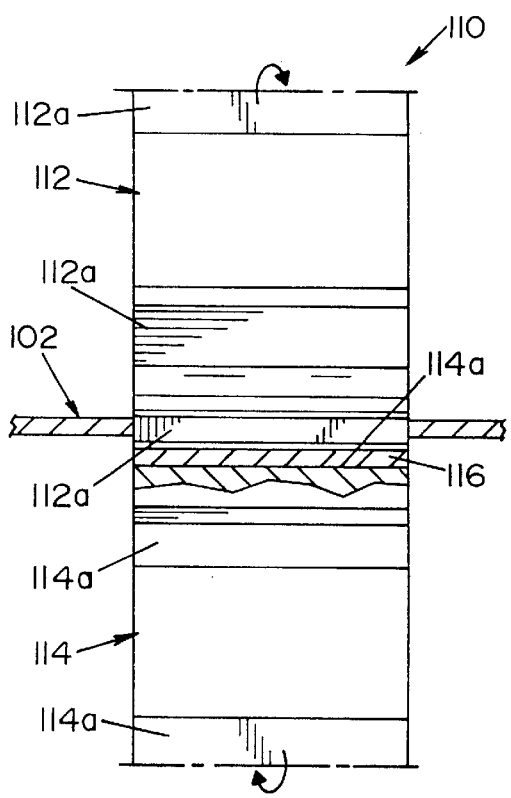
FIG. 11 is a view taken along lines 11—11 of FIG. 10.

FIG. 9 is a side elevational view of metallic sheet 102 schematically illustrating a method of forming slots 104. In FIG. 9, an upper roller 112 and a lower roller 114 are provided for continuously forming slots 104. In the embodiment shown, upper and lower rollers 112, 114 are timed to move at a predetermined speed related to the speed of metallic sheet 102 moving along path P. FIGS. 10 and 11 are enlarged views showing the interaction between upper and lower rollers 112, 114. Upper roller 112 includes a plurality of radially, spaced-apart punches 112a that are dimensioned to penetrate through metallic sheet 102. Cutters or punches 112a are received in recesses 114a formed in lower roller 114. The mating interaction between punches 112a and recesses 114a causes a rectangular tab 116 to be punched from metallic sheet 102 thereby forming slot 104, as metallic sheet 102 moves between upper and lower rollers 112, 114.

Figure 12:
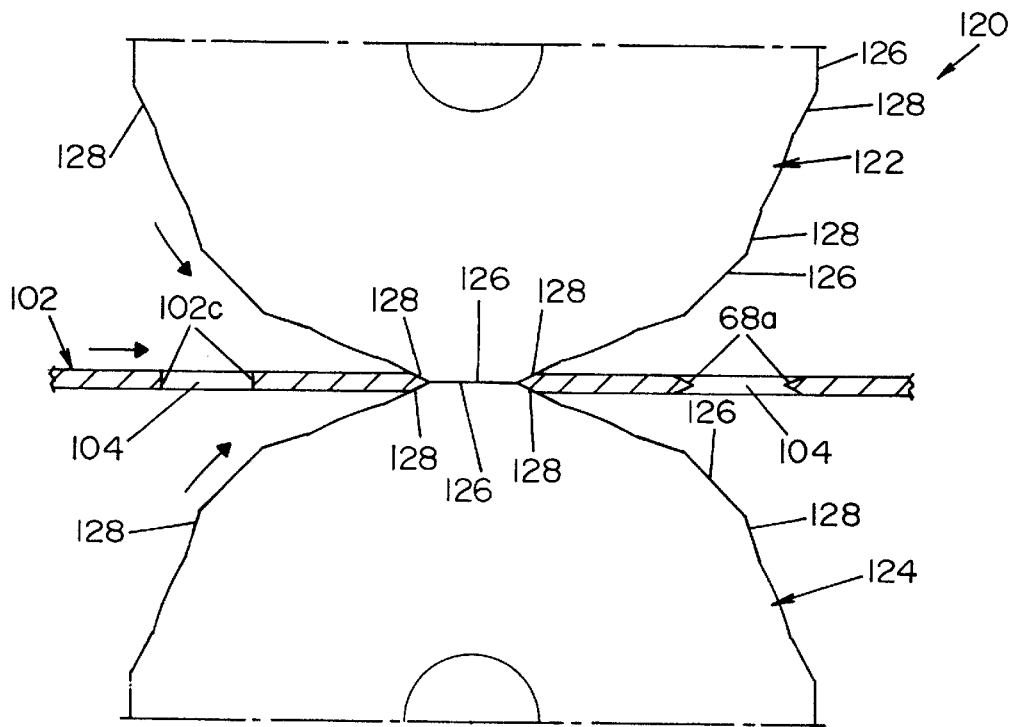
FIG. 12 is an enlarged, sectional view of the area designated in FIG. 9, schematically illustrating a process for tapering portions of the edges of the battery lead.

At a second location 120, an edge rolling operation is performed on edges 102c of sheet 102. Edges 102c, best seen in FIG. 8, define slots 104 to flatten such edges to a sharp, knife-like edge. A pair of opposed, forming rollers 122, 124 are provided to produce such flattening. Forming roller 122 is disposed above metallic sheet 102 and forming roller 124 is disposed below metallic sheet 102. Rollers 122, 124 are likewise timed to rotate at a predetermined speed relative to the speed of metallic sheet 102. Each roller 122 includes a plurality of equally spaced-apart mating surfaces 126 (best seen in FIG. 12) that are adapted to meet through slots 104. Between mating surfaces 126 are forming surfaces 128 that are shaped to flatten the lateral edges of slots 104, as illustrated in FIG. 12. FIG. 12 shows how edges 102c of sheet 102 are flattened into knife-like edges.

At a third location 130 along path P (see FIG. 9), the areas of metallic sheet 102 between slots 104 undergo a surface treatment to increase the adhesive properties thereof. In the embodiment shown, the areas, designated 102d, are etched by applying an etchant onto the surface of sheet 102. In FIG. 9, an etchant applicator 132 is schematically illustrated on opposite sides of metallic sheet 102. In FIG. 10, etched areas 102d are shown by cross-hatched lining.

At a fourth location, 140 (see FIG. 9), strips 74 of a generally continuous film formed of an adhesive/sealant material are applied to the opposed surfaces of metallic sheet 102 over slots 104, and etched areas 102d. Strips 74 of adhesive/sealant material are fed from rolls 142. Pinch rollers 144 are provided on opposite sides of metallic sheet 102 to force strips 74 of the adhesive/sealant material onto the upper and lower surfaces of metallic sheet 102.

At a fifth location, 150, individual cathode battery leads 66 are cut from metallic sheet 102. FIG. 9 schematically illustrates cutter rollers 152 having cutting blades 154 thereon to cut leads 66 from metallic sheet 102. Rollers 152 are adapted to cut out specific portions of metallic sheet 102. In FIG. 8, the areas cut away by rollers 152 are shown in phantom and are designated 156, 158. Cut out areas 156, 158 are disposed at each end of slots 104 and communicate therewith. Cut outs 156, 158 are equal in width to the width of slots 104, wherein, in the embodiment shown, the resultant battery lead 66 has straight sides. Strips 74 are cut along a line 162 so as to form the overlapping end portions 74 of band 72A (see FIG. 7).

As will be appreciated by those skilled in the art, the showing of FIG. 9 schematically illustrates mechanical devices for performing the desired steps in forming battery lead 66. It will, of course, be appreciated that other means may be used to provide the desired operations and processes, and that some of the foregoing operations and processes may be performed in multiple steps. For example, the cutting operation for removing cut outs 156, 158 may be separate from the cutting operation to separate, i.e., sever, strips 74. The resultant cathode battery lead 66 is like that disclosed in FIGS. 3–7, wherein treated region 102d of metallic sheet 102, is treated region 66a of battery lead 66, and the sharp, tapered edge portions 68a of battery lead 66 are defined by the rolled areas 102d of metallic sheet 102.

Figure 13:
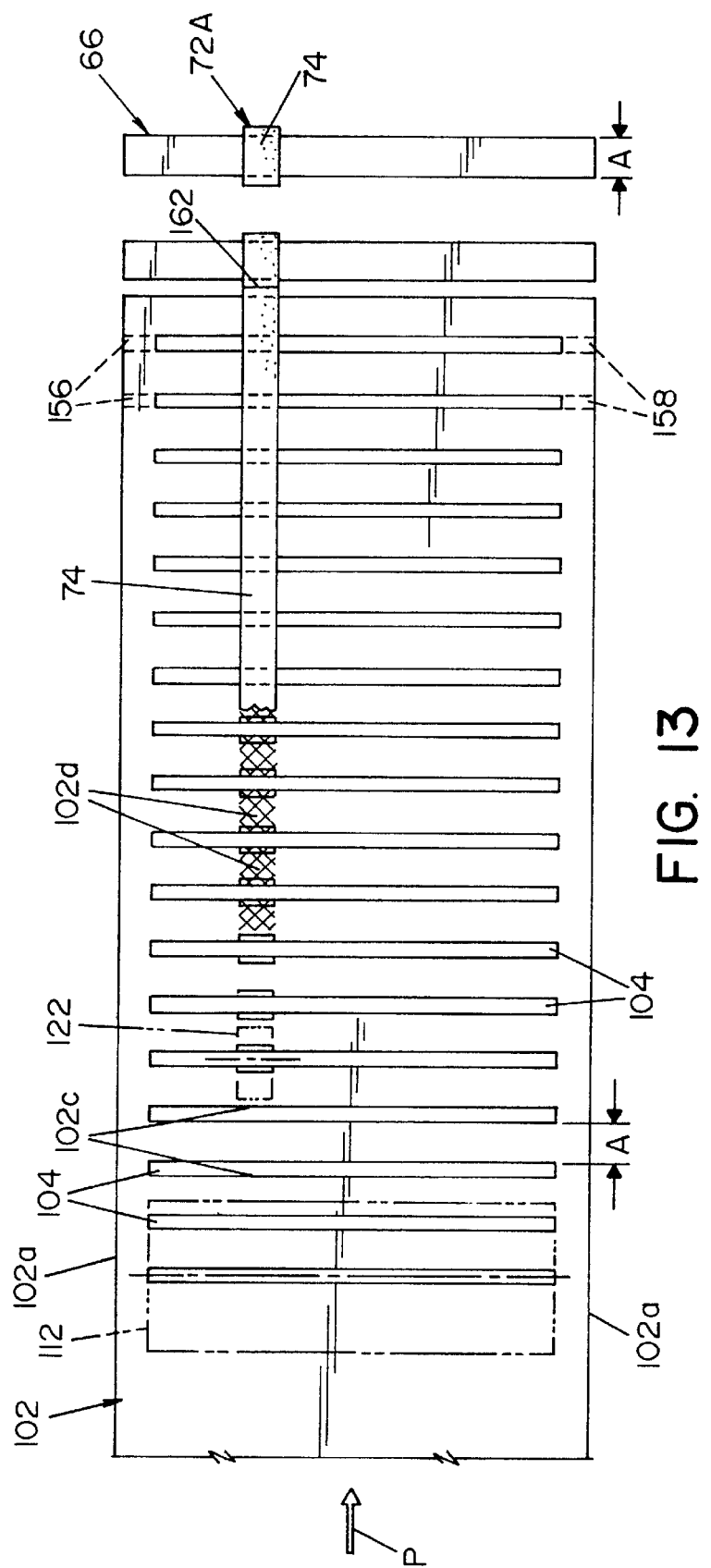
FIG. 13 is a top plan view of a generally continuous metallic sheet showing an alternate method of forming battery leads according to another aspect of the present invention.

Referring now to FIG. 13, an alternate embodiment of a process for forming battery leads 66 is shown. In the embodiment shown in FIG. 13, slots 104 are longer than those shown in FIG. 8. As a result, cut out areas 156, 158 are smaller, as illustrated in the drawing.

Referring now to the operation of battery leads 66, a battery lead 66 as heretofore described is attached to cathode tab weldment 62, typically by ultrasonic welding. Band 72A is adapted to be disposed between two layers of laminate 54, as best seen in FIG. 2. When heat and pressure are applied to laminate layers 54 to form seam 56, adhesive/sealant material forming strips 74 flow around cathode battery lead 66, and anode battery lead 88 to form a seal therewith. Layers 74 also seal against laminate layers 54. The flattened, or beveled, edge 68a of cathode battery lead 66 facilitates better sealing of strip layers 74 with each other and with cathode battery lead 66, as illustrated in FIG. 7.

The present invention thus provides a method of forming battery leads widthwise from a metallic sheet, wherein the processing steps for treating areas 66a of cathode battery lead 66 and for forming bands 72A thereon may be performed widthwise along metallic sheet 102 before severing the individual battery leads 66 or 88 therefrom, as contrasted with performing the same operations individually on an individual strip.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A method of forming battery leads, comprising the steps of:

forming a plurality of aligned, spaced-apart elongated openings in a rectangular, metallic sheet, said metallic sheet having side edges and a width between said side edges equal to a desired length of a battery lead, said openings extending between said side edges and being aligned in a row that extends parallel to said side edges;

treating areas of the surfaces of said metallic sheet between said openings to enhance the adhesive properties thereof;

applying a strip of an adhesive/sealant material to each side of said metallic strip over said areas and said slots; and cutting a battery lead from said metallic sheet by cutting said metallic sheet widthwise through each opening from one side edge to the other side edge.

2. A method of forming battery leads as defined in claim 1, wherein said metallic sheet is generally continuous and is conveyed lengthwise along a path.

3. A method of forming battery leads as defined in claim 2, wherein said step of forming a plurality of aligned, spaced-apart, elongated openings, said step of treating areas of the surfaces of said metallic sheet, said step of applying a strip of adhesive/sealant material, and said step of cutting a battery lead are performed as said metallic strip is conveyed continuously along said path.

4. A method of forming battery leads as defined in claim 3, wherein said method includes a forming process wherein a widthwise side of said metallic sheet defining said slot is formed to have a tapered knife-like edge.

5. A battery lead, comprised of:

a thin, elongated, rectangular strip of a metal selected from the group consisting of copper, aluminum and nickel; and a band of an adhesive/sealant material around a portion of said strip, said strip having knife-like edges where said adhesive/sealant material surrounds said strip.

6. A battery lead as defined in claim 5, wherein said band is formed of two strips of said adhesive/sealant material, said strips being on opposite sides of said strip.

7. A battery lead as defined in claim 6, wherein said strip extends beyond said knife-like edges.

* * * * *